United States Patent [19]

Park

[11] Patent Number: 5,600,523
[45] Date of Patent: Feb. 4, 1997

[54] EARTH LEAKAGE BREAKER

[75] Inventor: Kyung A. Park, Kyungsangbook-Do, Rep. of Korea

[73] Assignee: Goldstar Electron Co., Ltd., Cheongju, Rep. of Korea

[21] Appl. No.: 365,870

[22] Filed: Dec. 29, 1994

[30] Foreign Application Priority Data

Dec. 29, 1993 [KR] Rep. of Korea .................. 30626/1993

[51] Int. Cl.⁶ ....................................................... H02H 9/08
[52] U.S. Cl. ............................................... 361/42; 361/78
[58] Field of Search ......................... 361/42, 44, 45, 361/47, 78, 87, 96

[56] References Cited

U.S. PATENT DOCUMENTS

| | | | |
|---|---|---|---|
| 4,605,982 | 8/1986 | Harner | 361/87 |
| 4,783,713 | 11/1988 | Chen | 361/44 |
| 5,003,426 | 3/1991 | Yeh et al. | 361/96 |

Primary Examiner—Jeffrey A. Gaffin
Assistant Examiner—Sally C. Medley
Attorney, Agent, or Firm—Fleshner & Kim

[57] ABSTRACT

An earth leakage breaker comprising a zero-phase-sequence current transformer for detecting a current difference on an AC line with respect to both positive (+) and negative (−) directions to sense an electric leakage of the AC line, a comparator for comparing an output voltage from the zero-phase-sequence current transformer with a trigger reference voltage, a delay for delaying the output voltage from the zero-phase-sequence current transformer by a desired period, a subtracter for subtracting an output voltage from the delay from the output voltage from the zero-phase-sequence current transformer, first and second level discriminators for discriminating levels of output signals from the comparator and the subtracter, respectively, first and second duration generators for generating durations in response to output signals from the first and second level discriminators, respectively, a first pulse width generator for generating a pulse width corresponding to the duration from the first duration generator, a second pulse width generator for generating a pulse width corresponding to the duration from the second duration generator, an AND gate for ANDing the pulse widths from the first and second pulse width generators, and a trigger circuit for breaking the AC line by an output pulse width from the AND gate.

11 Claims, 8 Drawing Sheets

5,600,523

EARTH LEAKAGE BREAKER

BACKGROUND OF THE INVENTION

1. Field of the Invention

The present invention relates in general to an earth leakage breaker for sensing an electric leakage caused on an alternating current (referred to hereinafter as AC) line and breaking the sensed electric leakage, and more particularly to an earth leakage breaker for detecting a current difference on the AC line with respect to both positive (+) and negative (−) directions to sense and break accurately the electric leakage of the AC line and prevent a faulty operation due to a high surge resulting from a flash of lightning.

2. Description of the Prior Art

Referring to FIG. 1, there is shown a block diagram of a conventional earth leakage breaker. As shown in this drawing, the conventional earth leakage breaker comprises a zero-phase-sequence current transformer ZCT for detecting a current difference on an AC line to sense an electric leakage of the AC line, a comparator 1 for comparing an output voltage from the zero-phase-sequence current transformer ZCT with a trigger reference voltage VT, a level discriminator 2 for discriminating a level of an output signal from the comparator 1, a duration generator 3 for generating a duration in response to an output signal from the level discriminator 2, a pulse width generator 4 for generating a pulse width corresponding to the duration from the duration generator 3, and a trigger circuit 5 for breaking the AC line by the pulse width from the pulse width generator 4.

The operation of the conventional earth leakage breaker with the above-mentioned construction will hereinafter be described with reference to FIGS. 2A to 4D. FIGS. 2A to 2D are waveform diagrams of the signals from the components in FIG. 1 in the case where the electric leakage is caused on the AC line. FIGS. 3A to 3D are waveform diagrams of the signals from the components in FIG. 1 in the case where a positive (+) high surge is applied to the AC line. FIGS. 4A to 4D are waveform diagrams of the signals from the components in FIG. 1 in the case where a negative (−) high surge is applied to the AC line.

First, in the case where the electric leakage is caused on the AC line, a leakage current is generated on the AC line. The generated leakage current on the AC line is detected by the zero-phase-sequence current transformer ZCT, which then provides the resultant output voltage as shown in FIG. 2A. The comparator 1 compares the output voltage from the zero-phase-sequence current transformer ZCT with the trigger reference voltage $V_T$ and outputs the resultant signal to the level discriminator 2.

The level discriminator 2 discriminates the level of the output signal from the comparator 1. FIG. 5 is a detailed circuit diagram of the level discriminator 2. As shown in this drawing, the level discriminator 2 includes two constant current sources I1 and I2 connected in parallel to an output terminal of the comparator 1 and in series between a supply voltage source Vcc and a ground terminal, and a capacitor C1 connected between a node of the two constant current sources I1 and I2 and an output terminal of the level discriminator 2 and the ground terminal. If the output signal from the comparator 1 is low in level, the constant current source I2 is driven to discharge a voltage from the capacitor C1 to the ground terminal. As a result, the output signal from the level discriminator 2 becomes low (0 V) in level. On the other hand, if the output signal from the comparator 1 is high in level, the constant current source I1 is driven to charge a voltage on the capacitor C1. As a result, the output signal from the level discriminator 2 becomes high in level. In other words, the output signal of the level discriminator 2, as shown in FIG. 2B, is "high" only at those regions where the ZCT output reaches the trigger reference voltage $V_T$. Then, the output signal from the level discriminator 2 is applied to the duration generator 3.

Upon receiving the output signal from the level discriminator 2, the duration generator 3 generates the duration, which is present between threshold voltage levels Vth1 and Vth2 as shown in FIG. 2C. Then, the duration generator 3 outputs the resultant signal to the pulse width generator 4. The pulse width generator 4 generates the pulse width as shown in FIG. 2D corresponding to the duration from the duration generator 3. Noticeably, the pulse width generator 4 generates no pulse width if the level of the output signal from the level discriminator 2 is not arrived at the threshold voltage level Vth1. Then, the generated pulse width from the pulse width generator 4 is supplied to the trigger circuit 5.

Then, the trigger circuit 5 breaks the AC line by the pulse width from the pulse width generator 4. As a result, the electric leakage on the AC line is broken. In the conventional earth leakage breaker, if a negative (−) high surge is present on the AC line, such surge is properly recognized as electric leakage and proper breaking of the AC line occurs. However, when a positive (+) high surge is present on the AC line, such surge is erroneously recognized as electric leakage as shown in FIGS. 3A to 3D, thus resulting in faulty operation due to unwanted breaking of the AC line. However, the above-mentioned conventional earth leakage breaker has a disadvantage in that it senses the negative (−) high surge applied to the AC line as the electric leakage as shown in FIGS. 4A to 4D, resulting in the faulty operation being caused. Also, the conventional earth leakage breaker does not detect the current difference on the AC line with respect to a positive (+) direction even when the electric leakage is caused in the positive (+) direction on the AC line. For this reason, the conventional earth leakage breaker cannot break accurately the electric leakage of the AC line.

SUMMARY OF THE INVENTION

Therefore, the present invention has been made in view of the above problems, and it is an object of the present invention to provide an earth leakage breaker for detecting a current difference on an AC line with respect to both positive (+) and negative (−) directions to sense and break accurately an electric leakage of the AC line.

It is another object of the present invention to provide an earth leakage breaker for preventing a faulty operation due to a high surge resulting from a flash of lightning.

In accordance with the present invention, the above and other objects can be accomplished by a provision of an earth leakage breaker comprising current difference detection means for detecting a current difference on an alternating current line with respect to both positive (+) and negative (−) directions to sense an electric leakage of said alternating current line; comparison means for comparing an output voltage from said current difference detection means with a trigger reference voltage; delay means for delaying the output voltage from said current difference detection means by a desired period; subtracting means for subtracting an output voltage from said delay means from the output voltage from said current difference detection means to obtain a difference therebetween; first level discrimination means for discriminating a level of an output signal from said comparison means; second level discrimination means for discriminating a level of an output signal from said subtracting means; first duration generation means for generating a duration in response to an output signal from said first level discrimination means; second duration generation means for generating a duration in response to an output signal from said second level discrimination means; first pulse width generation means for generating a pulse width corresponding to the duration from said first duration generation means; second pulse width generation means for generating a pulse width corresponding to the duration from said second duration generation means; logic means for ANDing the pulse widths from said first and second pulse width generation means; and trigger means for breaking said alternating current line by an output pulse width from said logic means.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 6:
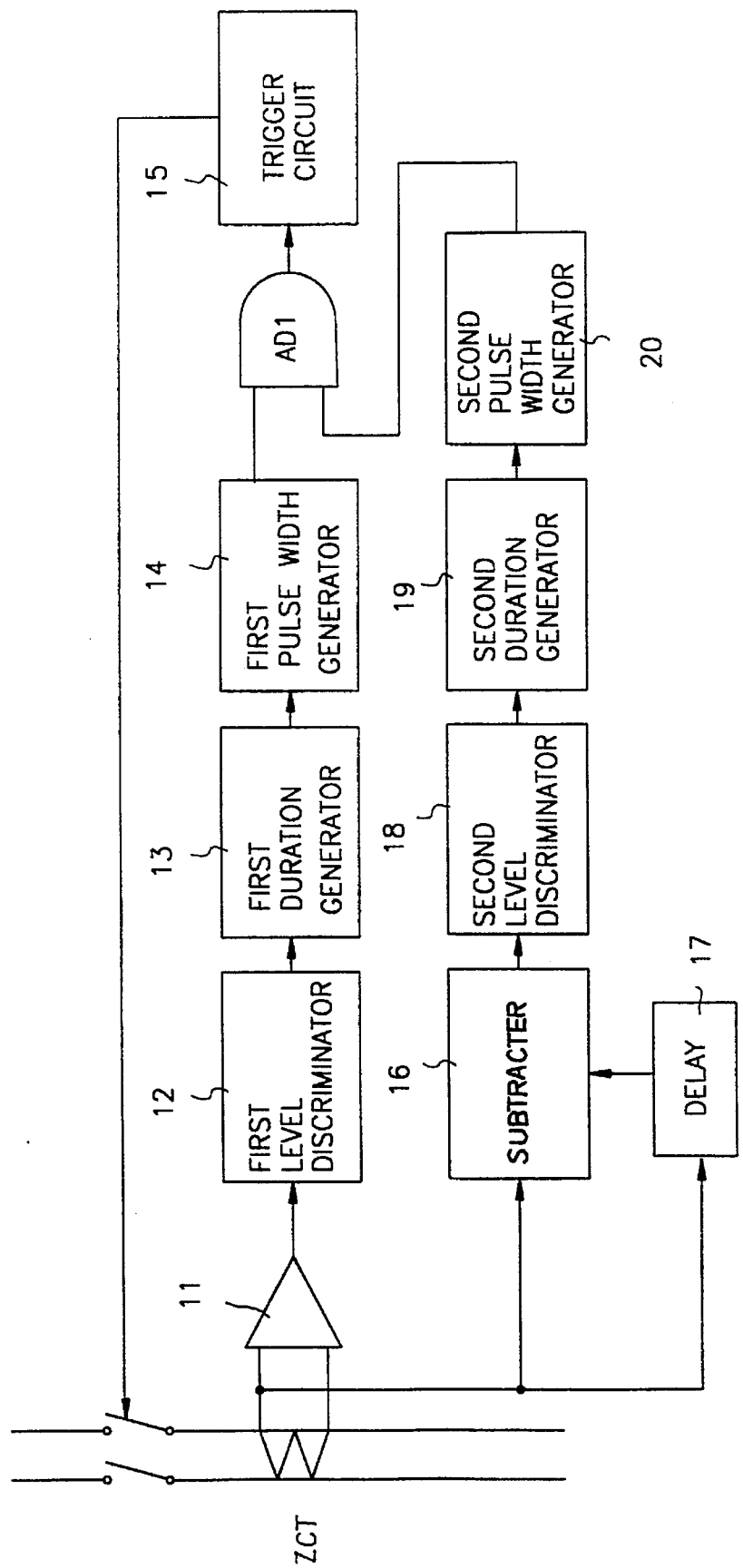
FIG. 6 is a block diagram of an earth leakage breaker in accordance with an embodiment of the present invention.

Referring to FIG. 6, there is shown a block diagram of an earth leakage breaker in accordance with an embodiment of the present invention. As shown in this drawing, the earth leakage breaker comprises a zero-phase-sequence current transformer ZCT for detecting a current difference on an AC line with respect to both positive (+) and negative (−) directions to sense an electric leakage of the AC line, a comparator 11 for comparing an output voltage from the zero-phase-sequence current transformer ZCT with a trigger reference voltage Vth1, a delay 17 for delaying the output voltage from the zero-phase-sequence current transformer ZCT by ¼ of a cycle, a subtracter 16 for subtracting an output voltage from the delay 17 from the output voltage from the zero-phase-sequence current transformer ZCT to obtain a difference therebetween, a first level discriminator 12 for discriminating a level of an output signal from the comparator 11, and a second level discriminator 18 for discriminating a level of an output signal from the subtracter 16.

The earth leakage breaker also comprises a first duration generator 13 for generating a duration in response to an output signal from the first level discriminator 12, a second duration generator 19 for generating a duration in response to an output signal from the second level discriminator 18, a first pulse width generator 14 for generating a pulse width corresponding to the duration from the first duration generator 13, a second pulse width generator 20 for generating a pulse width corresponding to the duration from the second duration generator 19, an AND gate AD1 for ANDing the pulse widths from the first and second pulse width generators 14 and 20, and a trigger circuit 15 for breaking the AC line by an output pulse width from the AND gate AD1.

The operation of the earth leakage breaker with the above-mentioned construction in accordance with the embodiment of the present invention will hereinafter be described in detail with reference to FIGS. 7A to 9J. FIGS. 7A to 7J are waveform diagrams of the signals from the components in FIG. 6 in the case where the electric leakage is caused on the AC line. FIGS. 8A to 8J are waveform diagrams of the signals from the components in FIG. 6 in the case where a positive (+) high surge is applied to the AC line. FIGS. 9A to 9J are waveform diagrams of the signals from the components in FIG. 6 in the case where a negative (−) high surge is applied to the AC line.

Figure 1:
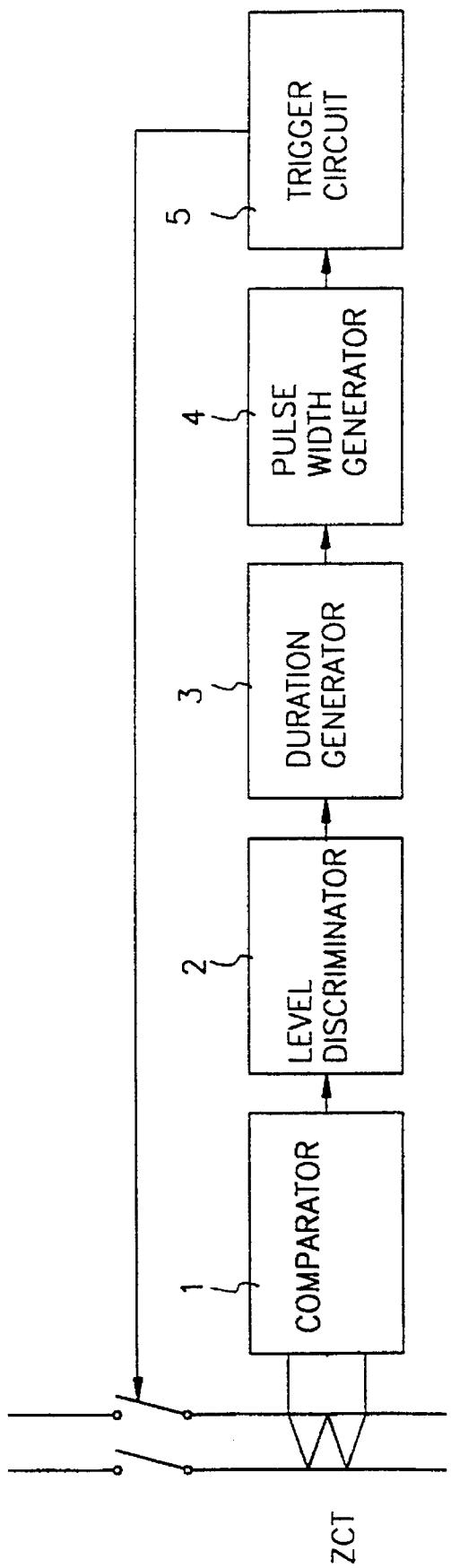
FIG. 1 is a block diagram of a conventional earth leakage breaker.
Figure 2A:
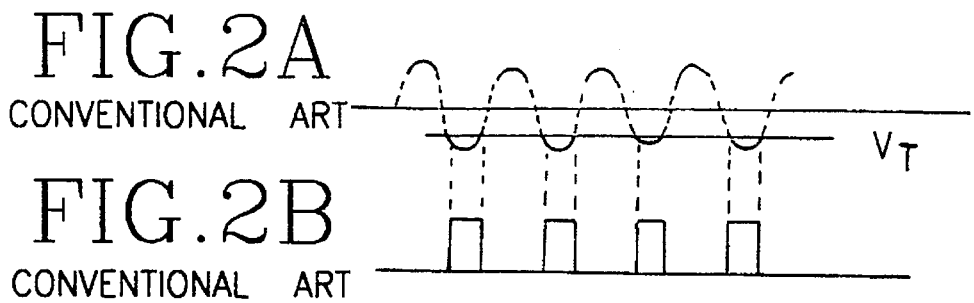
FIGS. 2A to 2D are waveform diagrams of signals from components in FIG. 1 in the case where an electric leakage is caused on an AC line.
Figure 2B:
Figure 2C:
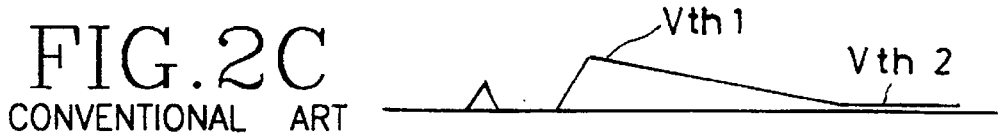
Figure 2D:
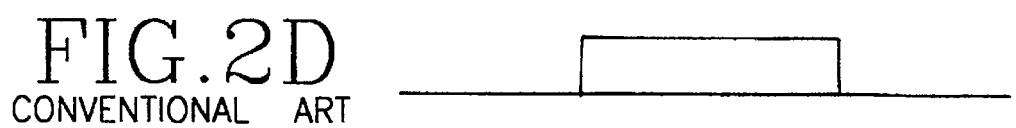
Figure 3A:
FIGS. 3A to 3D are waveform diagrams of the signals from the components in FIG. 1 in the case where a positive (+) high surge is applied to the AC line.
Figure 3B:
Figure 3C:
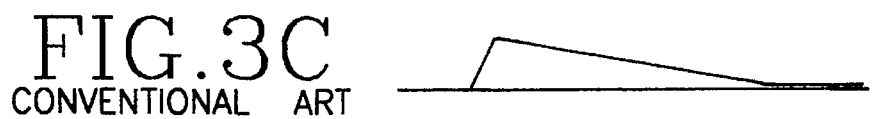
Figure 3D:
Figure 4A:
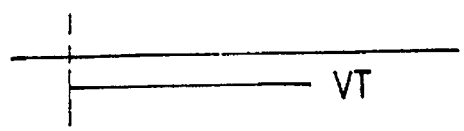
FIGS. 4A to 4D are waveform diagrams of the signals from the components in FIG. 1 in the case where a negative (−) high surge is applied to the AC line.
Figure 4B:
Figure 4C:
Figure 4D:
Figure 5:
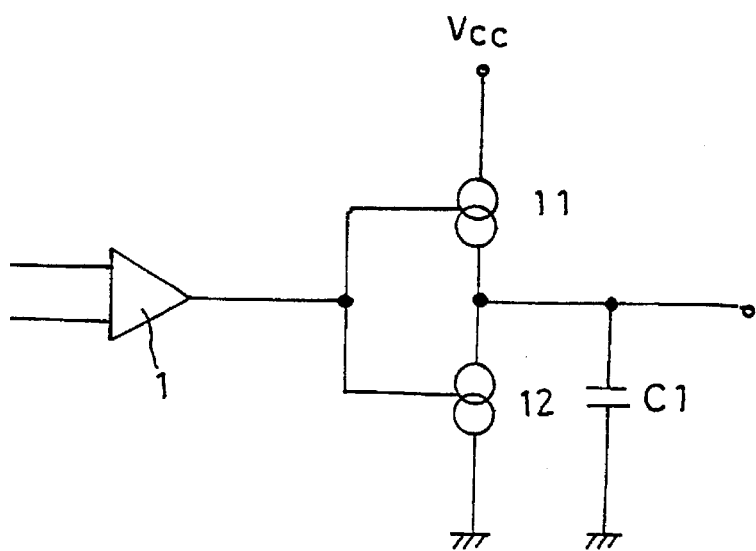
FIG. 5 is a detailed circuit diagram of a level discriminator in FIG. 1.
Figure 7A:
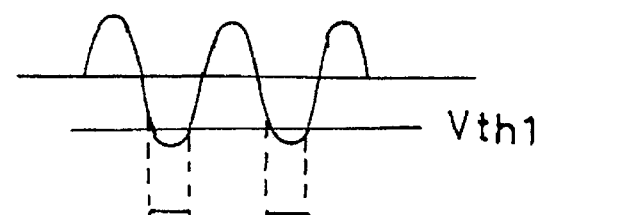
FIGS. 7A to 7J are waveform diagrams of signals from components in FIG. 6 in the case where the electric leakage is caused on the AC line.
Figure 7B:
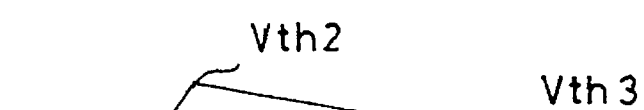
Figure 7C:
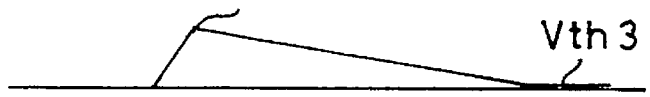

First, in the case where the electric leakage is caused on the AC line, the zero-phase-sequence current transformer ZCT detects the current difference on the AC line and outputs the resultant electric leakage detect signal as shown in FIG. 7A to the comparator 11. The comparator 11 compares the electric leakage detect signal from the zero-phase-sequence current transformer ZCT with the trigger reference voltage Vth1 and outputs the resultant signal to the first level discriminator 12. As stated previously with reference to FIG. 5, in the first level discriminator 12, the charging and discharging of the capacitor C1 are performed by the constant current sources I1 and I2, so that the signal as shown in FIG. 7C can be generated. The resultant output signal from the first level discriminator 12 is supplied to the first duration generator 13.

Figure 7D:
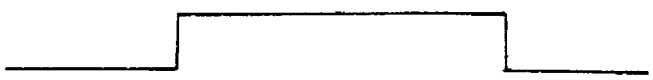

Upon receiving the output signal from the first level discriminator 12, the first duration generator 13 generates the duration, which is present between threshold voltage levels Vth2 and Vth3 as shown in FIG. 7C. Then, the first duration generator 13 outputs the resultant signal to the first pulse width generator 14. The first pulse width generator 14 generates the pulse width as shown in FIG. 7D corresponding to the duration from the first duration generator 13. Then, the pulse width from the first pulse width generator 14 is applied to the AND gate AD1.

Figure 7E:
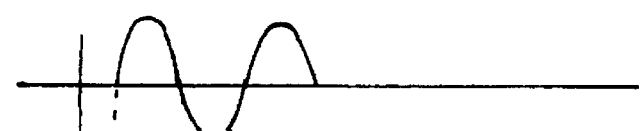
Figure 7F:
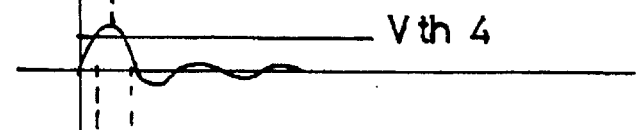

On the other hand, the delay 17 delays the electric leakage detect signal from the zero-phase-sequence current transformer ZCT as shown in FIG. 7A by ¼ of a cycle and outputs the resultant signal as shown in FIG. 7E to the subtracter 16. The subtracter 16 subtracts the output signal from the delay 17 as shown in FIG. 7E from the electric leakage detect signal from the zero-phase-sequence current transformer ZCT as shown in FIG. 7A and outputs the resultant signal as shown in FIG. 7F to the second level discriminator 18.

Figure 7G:
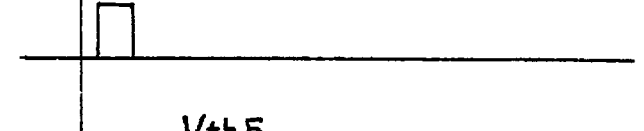
Figure 7H:
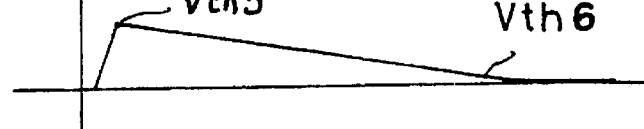
Figure 7I:
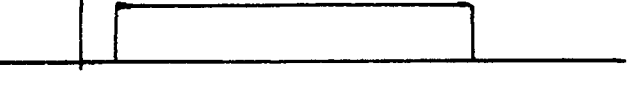

The second level discriminator 18 compares the output signal from the subtracter 16 with a threshold voltage Vth4 and outputs the resultant signal as shown in FIG. 7G to the second duration generator 19. Upon receiving the output signal from the second level discriminator 18, the second duration generator 19 generates the duration, which is present between threshold voltage levels Vth5 and Vth6 as shown in FIG. 7H. Then, the second duration generator 19 outputs the resultant signal to the second pulse width generator 20. The second pulse width generator 20 generates the pulse width as shown in FIG. 7I corresponding to the duration from the second duration generator 19. Then, the pulse width from the second pulse width generator 20 is applied to the AND gate AD1.

Figure 7J:
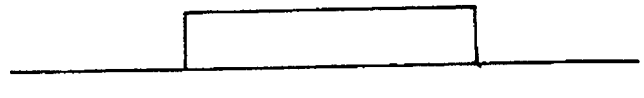

The AND gate AD 1 ANDs the pulse widths from the first and second pulse width generators 14 and 20 and outputs the resultant pulse width as shown in FIG. 7J to the trigger circuit 15. As a result, the trigger circuit 15 breaks the AC line by the pulse width from the AND gate AD 1 to break the electric leakage on the AC line.

As mentioned above, in accordance with the present invention, the earth leakage breaker senses the electric leakage of the AC line in consideration of the current difference on the AC line with respect to both the positive (+) and negative (-) directions and then breaks the AC line upon sensing the electric leakage. Therefore, the earth leakage breaker breaks accurately the electric leakage of the AC line.

Figure 8A:
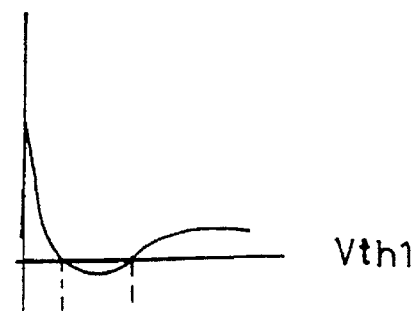
FIGS. 8A to 8J are waveform diagrams of the signals from the components in FIG. 6 in the case where the positive (+) high surge is applied to the AC line.
Figure 8B:
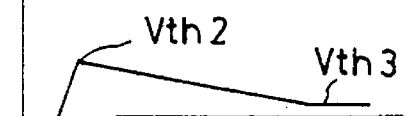
Figure 8C:
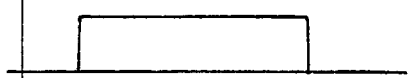

In the case where the positive (+) high surge resulting from a flash of lightning is applied to the AC line, the zero-phase-sequence current transformer ZCT detects the current difference on the AC line and outputs the resultant surge detect signal as shown in FIG. 8A to the comparator 11. The comparator 11 compares the surge detect signal from the zero-phase-sequence current transformer ZCT with the trigger reference voltage Vth1 and outputs the resultant signal of FIG. 8B to the first level discriminator 12. In the first level discriminator 12, as stated previously with reference to FIG. 5, the charging and discharging of the capacitor C1 are performed by the constant current sources I1 and I2, so that the signal as shown in FIG. 8C can be generated. The resultant output signal from the first level discriminator 12 is supplied to the first duration generator 13.

Figure 8D:

When receiving the output signal from the first level discriminator 12, the first duration generator 13 generates the duration, which is present between the threshold voltage levels Vth2 and Vth3 as shown in FIG. 8C. Then, the first duration generator 13 outputs the resultant signal to the first pulse width generator 14. The first pulse width generator 14 generates the pulse width as shown in FIG. 8D corresponding to the duration from the first duration generator 13. Then, the pulse width from the first pulse width generator 14 is applied to the AND gate AD1.

Figure 8E:
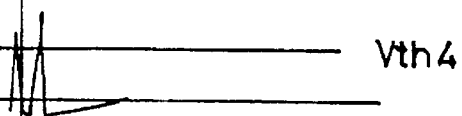
Figure 8F:
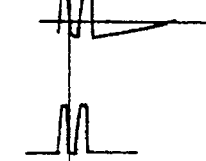

By the way, the delay 17 delays the surge detect signal from the zero-phase-sequence current transformer ZCT as shown in FIG. 8A by ¼ of a cycle and outputs the resultant signal as shown in FIG. 8E to the subtracter 16. The subtracter 16 subtracts the output signal from the delay 17 as shown in FIG. 8E from the surge detect signal from the zero-phase-sequence current transformer ZCT as shown in FIG. 8A and outputs the resultant signal as shown in FIG. 8F to the second level discriminator 18.

Figure 8G:
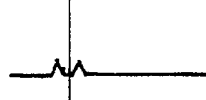
Figure 8H:
Figure 8:
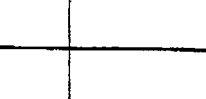
Figure 8:
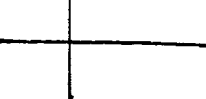

The second level discriminator 18 compares the output signal from the subtracter 16 with the threshold voltage Vth4 and outputs the resultant signal as shown in FIG. 8G to the second duration generator 19. Upon receiving the output signal from the second level discriminator 18, the second duration generator 19 generates the duration as shown in FIG. 8H. At this time, because the duration from the second duration generator 19 is not present between the threshold voltage levels Vth5 and Vth6, the second pulse width generator 20 generates no pulse width as shown in FIG. 8I. Then, no pulse width from the second pulse width generator 20 is applied to the AND gate AD1.

The AND gate AD1 inputs the pulse width from the first pulse width generator 14 as shown in FIG. 8D and no pulse width from the second pulse width generator 20 as shown in FIG. 8I. As a result, the AND gate AD1 outputs no signal as shown in FIG. 8J to the trigger circuit 15, thereby causing the trigger circuit 15 not to be operated. In result, the AC line is not broken. Therefore, the positive (+) high surge is prevented from being misrecognized as the electric leakage of the AC line, so that a faulty operation can be prevented.

Figure 9A:
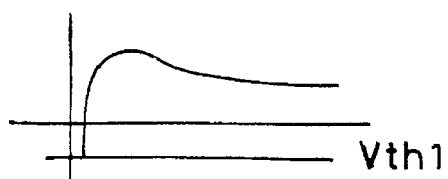
FIGS. 9A to 9J are waveform diagrams of the signals from the components in FIG. 6 in the case where the negative (−) high surge is applied to the AC line.
Figure 9B:
Figure 9C:

On the other hand, in the case where the negative (-) high surge resulting from the lightning is applied to the AC line, the zero-phase-sequence current transformer ZCT detects the current difference on the AC line and outputs the resultant surge detect signal as shown in FIG. 9A to the comparator 11. The comparator 11 compares the surge detect signal from the zero-phase-sequence current transformer ZCT with the trigger reference voltage Vth1 and outputs the resultant signal to the first level discriminator 12. As mentioned above, in the first level discriminator 12, the charging and discharging of the capacitor C1 are performed by the constant current sources I1 and I2, so that the signal as shown in FIG. 9C can be generated. The resultant output signal from the first level discriminator 12 is supplied to the first duration generator 13.

Figure 9D:

Upon receiving the output signal from the first level discriminator 12, the first duration generator 13 generates no duration as shown in FIG. 9C, thereby causing the first pulse width generator 14 to generate no pulse width as shown in FIG. 9D. Then, no pulse width from the first pulse width generator 14 is applied to the AND gate AD1.

Figure 9E:
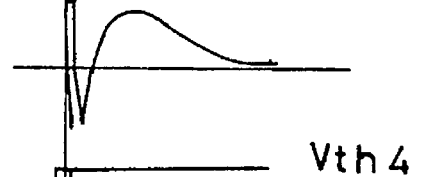
Figure 9F:
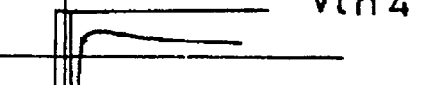

Also, the surge detect signal from the zero-phase-sequence current transformer ZCT as shown in FIG. 9A is applied to the delay 17. The delay 17 delays the received surge detect signal by ¼ of a cycle and outputs the resultant signal as shown in FIG. 9E to the subtracter 16. The subtracter 16 subtracts the output signal from the delay 17 as shown in FIG. 9E from the surge detect signal from the zero-phase-sequence current transformer ZCT as shown in FIG. 9A and outputs the resultant signal as shown in FIG. 9F to the second level discriminator 18.

Figure 9G:
Figure 9H:
Figure 9:
Figure 9:

The second level discriminator 18 compares the output signal from the subtracter 16 with the threshold voltage Vth4 and outputs the resultant signal as shown in FIG. 9G to the second duration generator 19. Upon receiving the output signal from the second level discriminator 18, the second duration generator 19 generates the duration as shown in FIG. 9H. At this time, because the duration from the second duration generator 19 is not present between the threshold voltage levels Vth5 and Vth6, the second pulse width generator 20 generates no pulse width as shown in FIG. 9I. Then, no pulse width from the second pulse width generator 20 is applied to the AND gate AD1.

The AND gate AD1 outputs no signal as shown in FIG. 9J to the trigger circuit 15 because it inputs no pulse width from the first and second pulse width generators 14 and 20 as shown in FIGS. 9D and 9I. As a result, the trigger circuit 15 is not operated, thereby causing the AC line not to be broken. Therefore, the negative (-) high surge is prevented from being misrecognized as the electric leakage of the AC line, so that a faulty operation can be prevented.

Figure 10:
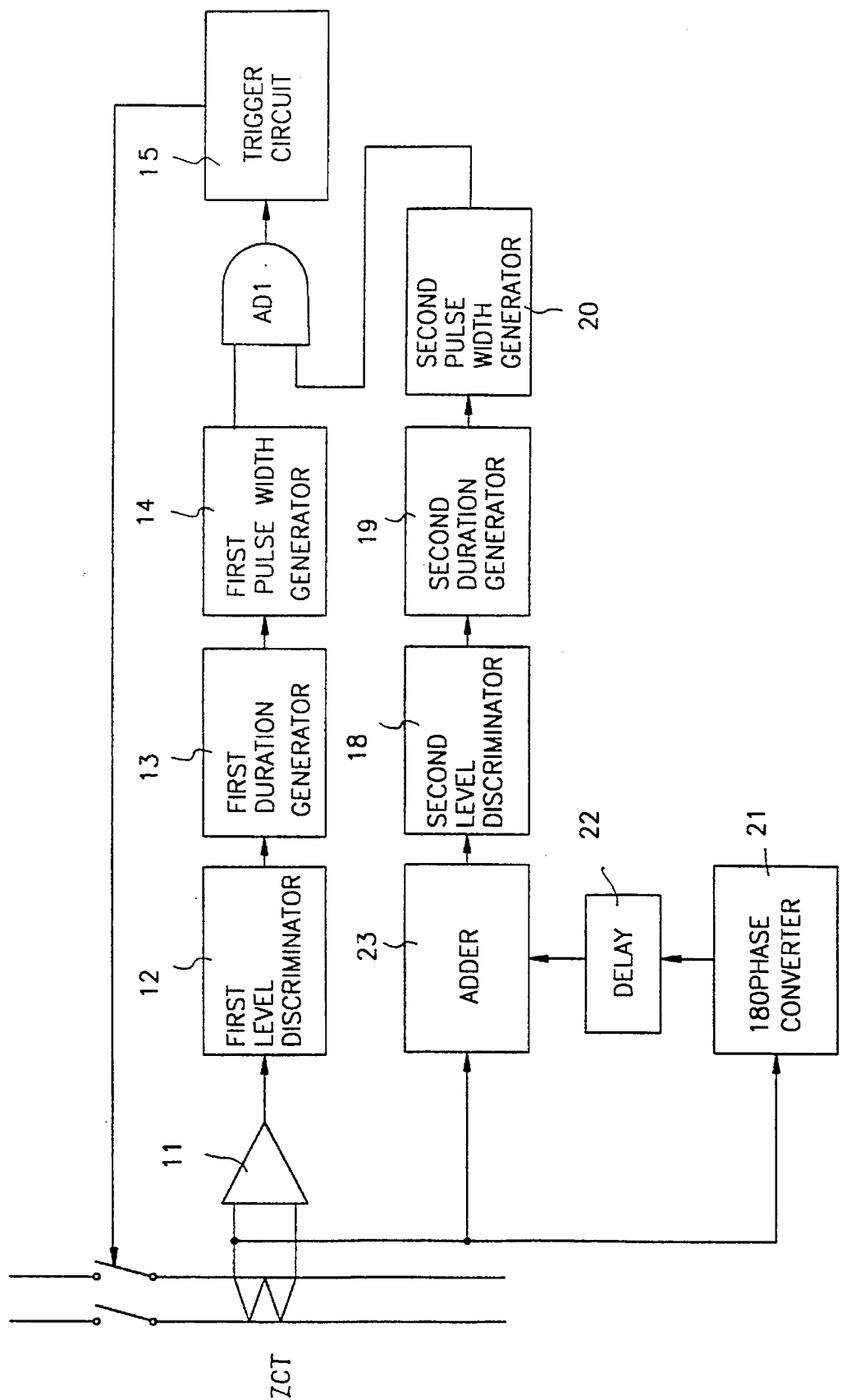
FIG. 10 is a block diagram of an earth leakage breaker in accordance with an alternative embodiment of the present invention.

Referring to FIG. 10, there is shown a block diagram of an earth leakage breaker in accordance with an alternative embodiment of the present invention. The construction of this drawing is the same as that of FIG. 6, with the exception that a 180°-phase converter 21, a delay 22 and an adder 23 are provided instead of the delay 17 and the subtracter 16. With this construction, the second embodiment of the present invention has the same effect as that of the first embodiment.

As apparent from the above description, according to the present invention, the earth leakage breaker does not recognize the positive (+) and negative (−) high surges applied to the AC line as the electric leakage. Also, the earth leakage breaker of the present invention detects the current difference on the AC line with respect to both the positive (+) and negative (−) directions. Therefore, the earth leakage breaker of the present invention has the effect of breaking accurately the electric leakage of the AC line.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An earth leakage breaker comprising:

current difference detection means for detecting a current difference on an alternating current line with respect to both positive (+) and negative (−) directions to sense an electric leakage of said alternating current line;

comparison means for comparing an output voltage from said current difference detection means with a trigger reference voltage;

delay means for delaying the output voltage from said current difference detection means by a desired period;

subtracting means for subtracting an output voltage from said delay means from the output voltage from said current difference detection means to obtain a difference therebetween;

first level discrimination means for discriminating a level of an output signal from said comparison means;

second level discrimination means for discriminating a level of an output signal from said subtracting means;

first duration generation means for generating a duration in response to an output signal from said first level discrimination means;

second duration generation means for generating a duration in response to an output signal from said second level discrimination means;

first pulse width generation means for generating a pulse width corresponding to the duration from said first duration generation means;

second pulse width generation means for generating a pulse width corresponding to the duration from said second duration generation means;

logic means for ANDing the pulse widths from said first and second pulse width generation means; and trigger means for breaking said alternating current line by an output pulse width from said logic means.

2. An earth leakage breaker as set forth in claim 1, wherein said delay means is adapted to delay the output voltage from said current difference detection means by ¼ a period.

3. An earth leakage breaker comprising:

current difference detection means for detecting a current difference on an alternating current line with respect to both positive (+) and negative (−) directions to sense an electric leakage of said alternating current line;

comparison means for comparing an output voltage from said current difference detection means with a trigger reference voltage;

180°-phase converting means for converting the phase of an output signal from said current difference detection means by 180°;

delay means for delaying the output signal from said 180°-phase converting means by a desired period;

adding means for adding an output voltage from said current difference detection means and an output voltage from said delay means;

first level discrimination means for discriminating a level of an output signal from said comparison means;

first duration generation means for generating a duration in response to an output signal from said first level discrimination means;

second level discrimination means for discriminating a level of an output signal from said adding means;

second duration generation means for generating a duration in response to an output signal from said second level discrimination means;

first pulse width generation means for generating a pulse width corresponding to the duration from said first duration generation means;

second pulse width generation means for generating a pulse width corresponding to the duration from said second duration generation means;

logic means for ANDing the pulse widths from said first and second pulse width generation means; and trigger means for breaking said alternating current line by an output pulse width from said logic means.

4. A breaker circuit comprising:

means for detecting a current difference among or between a plurality of current lines, and outputting a first signal;

means for generating a second signal of a first predetermined period in response to said first signal from said detecting means;

means for delaying said first signal by a predetermined cycle;

means for generating a third signal of a second predetermined period in response to said delayed first signal from said delaying means, said means for generating said third signal having one of i) a subtractor which performs a substraction between levels of said first signal and said delay first signal, and ii) means for converting a phase of said first signal by about 180 degrees, and an adder which performs an addition between levels of said first signal and said delayed first signal;

means for performing a logical operation between said second and third signals, and outputting a fourth signal; and means, responsive to a reception said fourth signal, for disconnecting said plurality of current lines when said current difference indicates an electric leakage.

5. The circuit breaker of claim 4, wherein said detecting means is a zero-phase-sequence current transformer.

6. The circuit breaker of claim 4, wherein said means for generating said second signal comprises:
- a comparator for comparing said first signal with a predetermined reference voltage;
- a first level discriminator coupled to said comparator such that a level of an output signal from said comparator is discriminated;
- a first duration generator, coupled to said first level discriminator, to generate a signal indicative of said first predetermined period; and
- a first pulse generator to generate said second signal of said first predetermined period.

7. The breaker circuit of claim 4, wherein said delaying means delays said first signal by about ¼ cycle.

8. The breaker circuit of claim 4, wherein said means for generating said third signal further comprises:
- a second level discriminator to discriminate an output signal of said subtractor;
- a second duration generator, coupled to said second level discriminator, to generate a signal indicative of said second predetermined period; and
- a second pulse generator to generate said third signal of said second predetermined period.

9. The breaker circuit of claim 8, wherein said means for performing a logical operation is a AND gate.

10. The breaker circuit of claim 4, wherein said disconnecting means comprises:
- a plurality of switches, each switch being placed in a corresponding one of said plurality of current lines; and
- a trigger circuit, responsive to said fourth circuit, to trigger said plurality of switches for disconnecting said plurality of current lines when said current difference indicates an electric leakage.

11. The breaker circuit of claim 4, wherein said means for generating said third signal further comprises:
- a second level discriminator to discriminate an output signal of said adder;
- a second duration generator, coupled to said second level discriminator, to generate a signal indicative of said second predetermined period; and
- a second pulse generator to generate said third signal of said second predetermined period.

* * * * *